(No Model.)
M. C. CANTRELL
Cant Dog.
No. 240,505.                     Patented April 26, 1881.
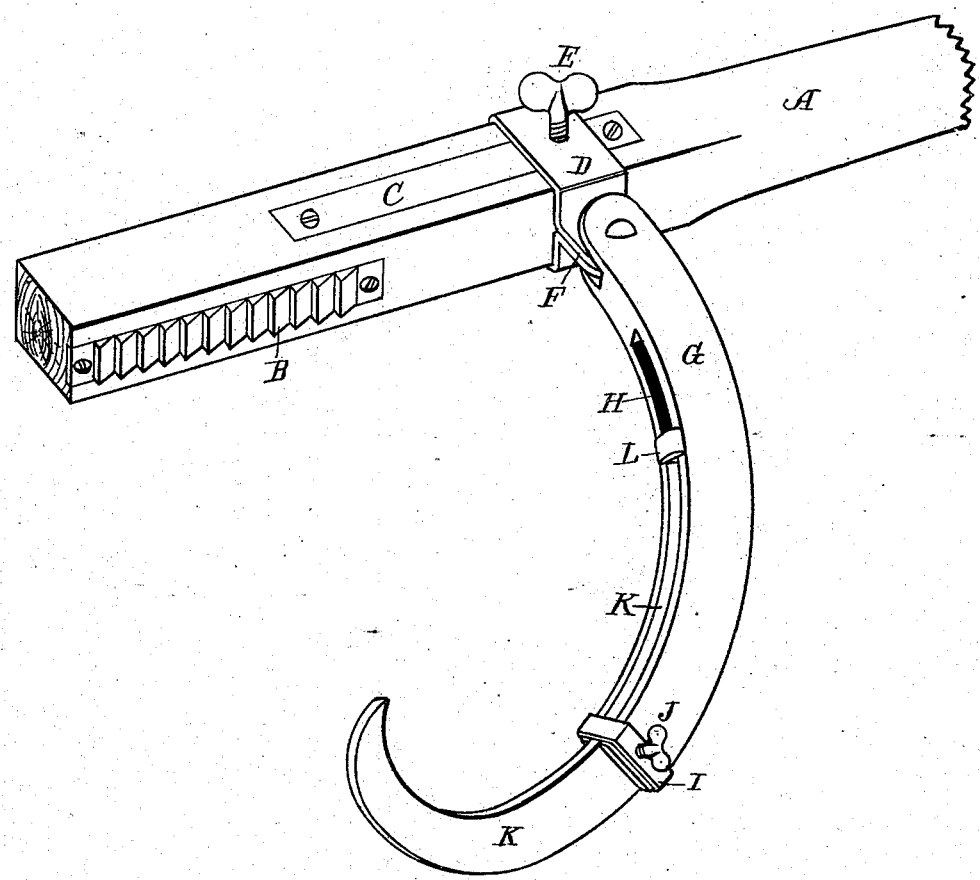
Witnesses:
O. J. Bailey
J. C. Christian
Inventor:
Milton C. Cantrell
by J. S. Zerbe
Atty.

UNITED STATES PATENT OFFICE.

MILTON C. CANTRELL, OF HARRISON, ARKANSAS.

CANT-DOG.

SPECIFICATION forming part of Letters Patent No. 240,505, dated April 26, 1881.

Application filed March 7, 1881. (No model.)

*To all whom it may concern:*

Be it known that I, MILTON C. CANTRELL, of Harrison, in the county of Boone and State of Arkansas, have invented a new and useful Improvement in Cant-Hooks, which improvement is fully set forth in the following specification and accompanying drawing, in which—

Figure 1 is a perspective elevation of the cant-hook.

The object of my invention is to provide a cant-hook capable of being applied to logs of any size; and to this end it consists in an ordinary handle provided at the end with a toothed bar, and also with a sliding collar, to which a curved arm is hinged. The hook proper is adapted to slide within the arms attached to the movable collar, so that it may be lengthened, as will be hereinafter more fully set forth.

In the accompanying drawing, A represents the bar or handle of the device, provided on the lower side, near the end, with a toothed bar, B, to rest on the log and prevent slipping. A movable collar, D, is placed on the bar, and this is provided with a thumb nut and screw, E, passing through the collar and adapted to act against the side of the bar A.

To provide against the wearing of the handle at the point along which the screw travels, a metal plate, C, is sunk in the bar A flush with the surface.

The lower side of the collar D is provided with ears F, to which the upper end of a curved arm, G, is hinged. The curved arm G is provided with a recess, H, so as to permit the shank K of the hook to pass into this space.
The upper end of the shank is provided with a head, L, and the lower end of the curved arm with a rigid collar, I, so as to permit the shank of the hook to slide within the curved arm and hold it in proper relation with said arm. A thumb-nut, J, and screw through the collar I serves to hold the shank at any desired point.

In using this device the collar D can be moved along to any point, and the sliding shank also permits the adjustment of the hook for any size log.

Having described my invention, what I claim as new, and desire to secure by Letters Patent, is—

In a cant-hook, the bar A, having on its under side, near the end, a toothed bar, B, and on the side a facing-plate, C, in combination with the adjustable collar D, having hinged thereto a curved arm, G, provided with a recess, within which slides the shank K of an adjustable hook, as herein set forth.

MILTON C. CANTRELL.

Witnesses:
A. C. HULL,
H. C. KING.